N. SIFFERMAN.
Horseshoe.
No. 197,418. Patented Nov. 20, 1877.
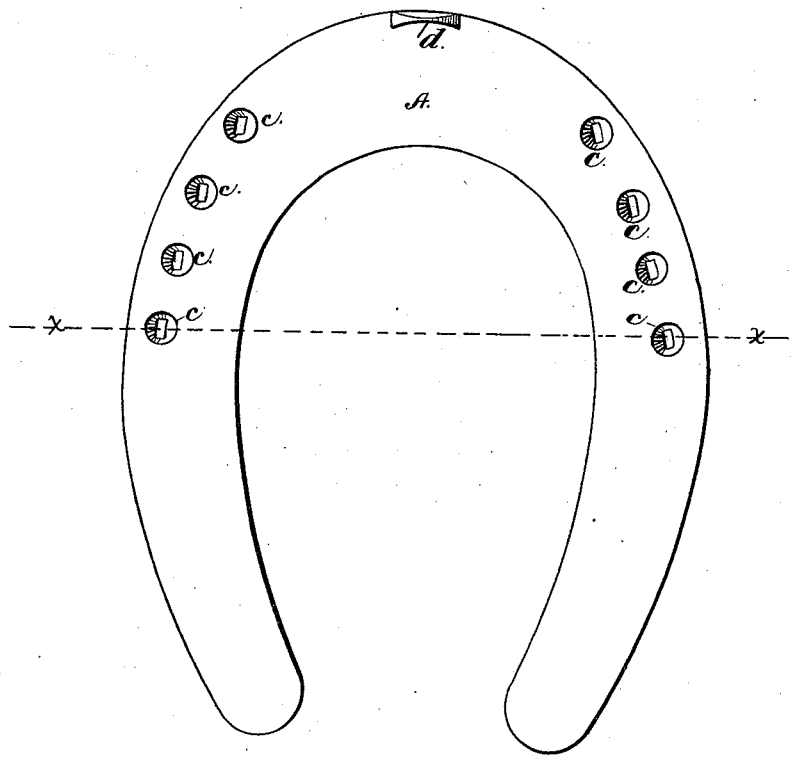
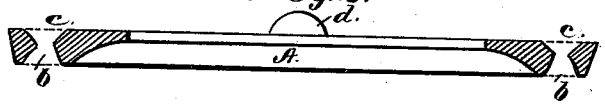
Witnesses:
Chas. M. Peck
Wm Ritchie
Inventor;
Nathan Sifferman
by his Attys
Peck & Co

UNITED STATES PATENT OFFICE.

NATHAN SIFFERMAN, OF DAYTON, OHIO.

IMPROVEMENT IN HORSESHOES.

Specification forming part of Letters Patent No. 197,418, dated November 20, 1877; application filed June 5, 1877.

*To all whom it may concern:*

Be it known that I, NATHAN SIFFERMAN, of Dayton, in the county of Montgomery and State of Ohio, have invented certain new and useful Improvements in Horseshoes; and I do hereby declare the following to be a full, clear, and exact description of the same.

This invention consists in providing a cast horseshoe of malleable iron with countersunk orifices on its upper face, which open into the crease or fullering on its under face, whereby I am enabled to drive the nails at any desired inclination, which is an important advantage.

Figure 1 of the accompanying drawings is a plan view of my improved horseshoe. Fig. 2 is a sectional view through the line $x\,x$ of Fig. 1.

A represents a horseshoe of the usual shape, and provided on its under side with the usual crease $b$, Fig. 2. Opening into this crease from the upper face are the countersunk orifices $c$, Figs. 1 and 2. $d$ is the usual toe-clip.

This shoe thus formed is cast and rendered malleable in the usual way, and for simplicity and durability cannot be excelled.

By means of the countersinks $c$ the narrowest portion of the orifices is at the center of the shoe's thickness, and I am enabled to incline the nail at any angle to suit the hoof. This result cannot be attained when the orifices are of the ordinary shape and size, and its advantages are obvious.

I do not claim a shoe made from malleable iron alone; but

What I claim is—

A horseshoe of malleable iron, provided on its upper face with countersunk orifices opening into the crease, whereby the nails can be driven into the hoof at any desirable inclination.

Witness my hand this 9th day of May, A. D. 1877.

NATHAN SIFFERMAN.

Witnesses:
CHAS. M. PECK,
LEO GREULICH.